Patented Nov. 13, 1923.

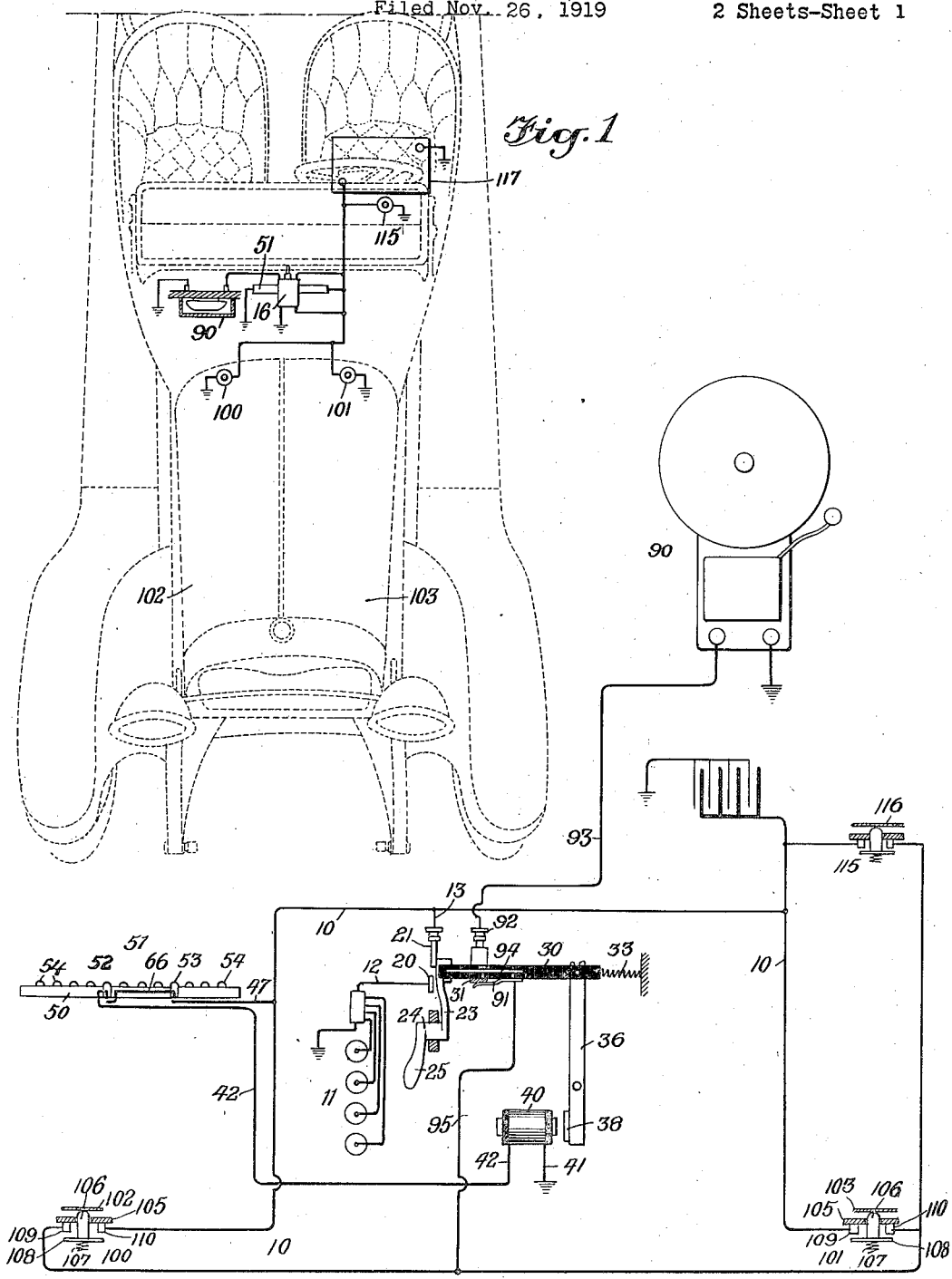

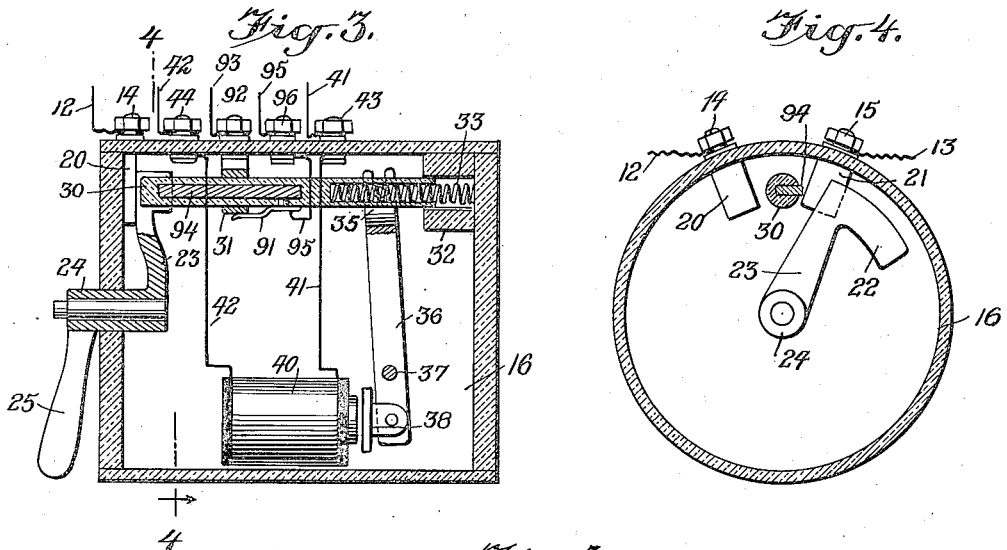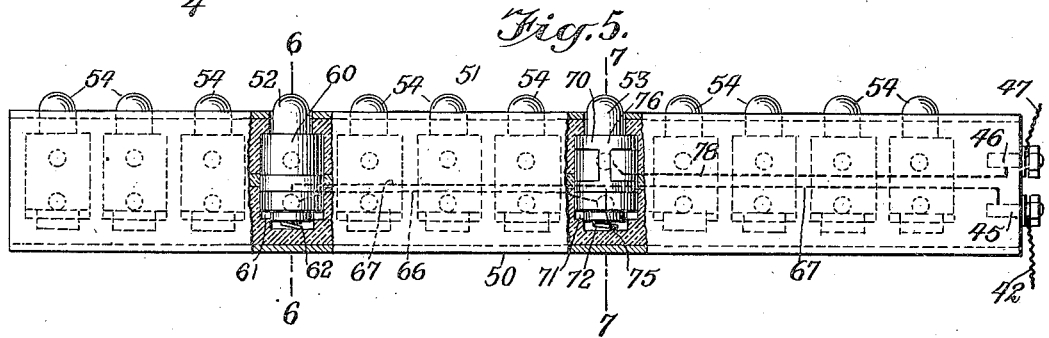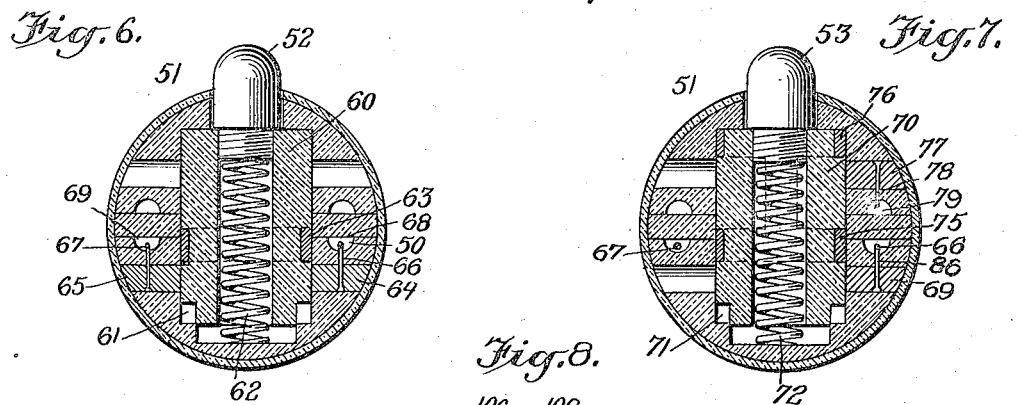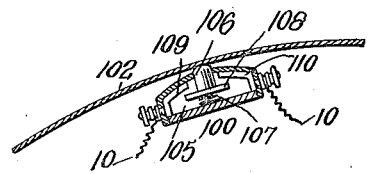

1,474,262

UNITED STATES PATENT OFFICE.

FRANK HOYT AND CHANDLER FINNIE HOLMES, OF NEWBURYPORT, MASSACHUSETTS.

LOCKING DEVICE AND ALARM FOR AUTOMOBILES.

Application filed November 26, 1919. Serial No. 340,784.

*To all whom it may concern:*

Be it known that we, FRANK HOYT, a citizen of the United States, and CHANDLER F. HOLMES, a citizen of the United States, and residents of Newburyport, in the county of Essex and State of Massachusetts, have invented a new and Improved Locking Device and Alarm for Automobiles, of which the following is a full, clear, and exact description.

The object of the invention is to provide a new and improved locking device and alarm for automobiles and similar power driven vehicles arranged to permit the user to render the ignition system of the internal combustion engine inoperative and to sound an alarm should an unauthorized person attempt to open the hood or the battery box.

Another object is to permit of readily changing the combination of the controlling switch whenever it is desired to do so by the driver or owner of the vehicle.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a diagrammatic view of the improved locking device and alarm as applied to an automobile;

Figure 2 is an enlarged diagrammatic view of the improved locking device and alarm;

Figure 3 is a sectional side elevation of the switch for the circuit of the ignition system and that of the alarm;

Figure 4 is a cross section of the same on the line 4—4 of Figure 3;

Figure 5 is a side elevation with parts in section of the keyboard switch;

Figure 6 is an enlarged cross section of the same on the line 6—6 of Figure 5;

Figure 7 is a similar view of the same on the line 7—7 of Figure 5; and

Figure 8 is a cross section of a portion of the engine hood and the automatic circuit closer controlled by the hood.

The electric circuit 10 of the ignition system for the cylinders 11 of the internal combustion engine used for driving the automobile or other vehicle is connected by wires 12 and 13 (see Figure 4) with binding posts 14 and 15 held on a switch casing 16, preferably located at the dashboard of the automobile so as to be within convenient reach of the driver. The binding posts 14 and 15 connect with contacts 20 and 21 arranged within the casing 16, and the said contacts 20 and 21 are adapted to be connected with each other by the segmental end 22 of a switch lever 23 having its hub 24 mounted to turn in one end of the casing 16. The outer end of the hub 24 is provided with a handle 25 under the control of the driver to permit the latter to swing the switch lever 23 from the open position shown in Figure 4 into a closed position to connect the contacts 20 and 21 with each other for closing the ignition circuit. When the switch lever 23 is in open position the end 22 is in engagement with the contact 21.

A bolt 30 of an insulating material is mounted to slide in bearings 31 and 32 arranged within the casing 16, and this bolt is pressed on by a spring 33 (see Figure 3) to project the forward end into the path of the switch lever 23 to prevent the latter from being moved from the open position shown in Figure 2 into a closed position. The bolt 30 is engaged by the forked end 35 of an armature lever 36 fulcrumed at 37 within the casing 16 and carrying an armature 38 adapted to be attracted by an electromagnet 40 whenever the latter is energized. When the electromagnet is deenergized the spring 33 moves the bolt 30 into locking position, as above explained, but when the electromagnet 40 is energized the armature 38 is attracted and the armature lever 36 retracts the bolt 30 to allow of moving the switch lever 23 into closed position relative to the contacts 20 and 21.

The wires 41 and 42 of the electromagnet 40 lead out of the casing 16 by way of binding posts 43 and 44, and the wire 41 leads to the ground and the wire 42 connects with a binding post 45 arranged on a casing 50 of a keyboard switch 51 preferably attached to the dashboard of the automobile within convenient reach of the driver. The casing 50 is provided with another binding post 46 connected by a wire 47 with the main or ignition circuit. The keyboard switch 51 is provided with a plurality of push buttons, of which two are active ones at a time while the remaining ones are dummies. The active push buttons shown in Figure 5 are the ones marked 52 and 53 while the dummies are marked 54, and one-half of the dummies are constructed like the active push button 52 and the other half are constructed like the push button 53. The arrangement is such that any pair of push buttons can be made the active ones and connect with the binding posts 45 and 46 so that on pressing the active push button simultaneously, the circuit for the electromagnet 40 is closed to energize the latter, and when the push buttons are released the electromagnet 40 is de-energized. The active push button 52 is constructed as follows: The body 60 of this push button is preferably made cylindrical and mounted to slide in a suitable bearing 61 arranged in the casing 50. The push button 52 is held normally in uppermost position by a spring 62, and the body 60 is provided with a contact ring 63 fitted in a groove in the peripheral face of the body 60, and this ring when the push-button 52 is depressed makes contact with longitudinal bars 64, 65 arranged in the casing 50. The bars 64 and 65 are connected with wires 66 and 67 extending through longitudinal grooves 86, 69 formed in the casing 50. The wire 67 connects with the binding post 45 while the wire 66 is connected by a wire 68 with a bar 69 in the casing 50 adjacent the body 70 of the push button 53. The push button 53 is mounted to slide in a bearing 71 and is pressed on by a spring 72 similar to the spring 62. The peripheral face of the body 70 is provided with a contact ring 75 adapted to move into engagement with the contact bar 69 on depressing the button 53. The peripheral face of the body 70 is further provided near its upper end with a contact ring 76 connected with the ring 75 adapted to make contact with a bar 77 held in the casing 50 and connected with a wire 78 extending through a longitudinal groove 79 formed in the casing 50. The wire 78 connects with the binding post 46.

It will be noticed that when the two push buttons 52 and 53 are depressed simultaneously against the tension of their springs 62, 72 then the ring 63 moves into engagement with the contact bars 64 and 65 while the rings 75, 76 move into engagement with the contact bars 69 and 77 and hence the circuit for the electromagnet is closed and the latter is thus energized for actuating the armature lever 36 with a view to retracting the bolt 30 as previously explained. When the push buttons 52 and 53 are released they open the circuit on returning to their normal outermost positions by the action of the springs 62, 72. The push buttons 52 and 53 are the ones known only to the driver and hence an unauthorized person in depressing any other pair of buttons cannot close the circuit and hence the magnet 40 remains de-energized. Normally the switch lever 23 is in closed position, that is, it connects the contacts 20 and 21 with each other, and the bolt 30 now bears against the segment 22. The driver, prior to leaving the automobile, swings the switch lever 23 into the open position shown in Figures 3 and 4, whereby the ignition circuit is broken and the segment 22 moves out of engagement with the bolt 30 to allow the spring 33 thereof to shoot the bolt into the locking position shown in Figure 3, thus preventing closing of the switch 23. It will be noticed that the bolt 30 can only be retracted by the driver pressing the active push buttons 52 and 53 to close the circuit for the electromagnet 40 and thereby cause a retraction of the bolt 30 to enable the driver to return the switch 23 to normal closed position. It is understood that the wires 66, 67 and 78 can be readily connected with any pair of push buttons of the whole series to correspondingly change the combination known only to the driver or owner of the automobile.

An electric alarm 90, preferably arranged on the dashboard, is controlled by the bolt 30, and for this purpose the bolt is provided with a spring contact 91 engaging the bearing 31 previously mentioned. The bearing 31 is provided with a binding post 92 connected with the wire 93 connected with the alarm 90. The spring contact 91 is connected with a contact bar 94 inserted lengthwise in the bolt 30, and from the spring contact 91 leads a wire 95 out of the casing 16 by a binding post 96 and this wire 95 connects with the ignition circuit 10. The contact bar 94 is engaged by the free end of the switch lever 31 in case an unauthorized person attempts to move the switch lever 30 from the open position shown in Figure 4 into a closed position. It will be noticed that the projected bolt 30 prevents such movement but as soon as the switch lever 23 engages the central bar 94 the alarm circuit is closed and the alarm 90 is sounded. When the driver returns to the locked automobile, he first presses the active push buttons 52, 53 to retract the bolt 30 and in doing so the spring contact 91 moves out of engagement with the bearing 92 and hence the alarm circuit is broken, and after the switch lever 23 is moved into closed position by the driver the push buttons 52, 53 are released to release the bolt 30 and allow it to move a short distance forward against the segment 22 but without returning the spring contact 91 to the bearing 92. Only after the switch lever 23 is moved into open position (see Figure 4) does the bolt 30 move to the locking and contact-making position shown in Figure 3.

In the ignition circuit are arranged a number of circuit breakers 100 and 101 operating in conjunction with the sections 102 and 103 of the hood for the motor of the automobile, and the circuit breakers 100 and 101 are alike in construction and each one is provided with a casing 105 in which is held a contact button 106 pressed on by a spring 107 to engage the inner face of the corresponding hood section 102 or 103. The button 106 is provided with a contact member 108 adapted to engage contacts 109 and 110 arranged within the casing 105, and the contacts 109 and 110 are connected with the wires of the circuit 10. Now when a hood section 102 or 103 is opened by an unauthorized person then the corresponding button 106 is moved outward by its spring 107 and the contact member 108 engages the contacts 109 and 110 thus closing the circuit for the alarm 90 thereby ringing the latter to attract the attention of the passing driver. A similar circuit breaker 115 is arranged in conjunction with the lid 116 of a battery box 117 and hence when an unauthorized person opens the lid 116 the alarm 90 is sounded.

From the foregoing it will be seen that by the arrangement described, the ignition system of the internal combustion engine of the automobile is rendered inoperative on the driver swinging the switch 23 from the normal closed position into the open position shown in Figure 4, and this switch can only be returned to closed position on the driver pressing the correct active push buttons 52 and 53.

It will further be noticed that when an unauthorized person attempts to open the section 102 or 103 of the hood or attempts to close the switch lever 23 an alarm is given, and likewise in case such person should attempt to open the battery box 117.

Having thus described our invention, we claim as new and desire to secure by Letters Patent:—

1. In combination, a pair of spaced contacts, a movable bridge member comprising an arm pivoted at its one end and formed with a lateral projection adapted to close an electric cirruit when connected across said contacts, a bolt extending between said contacts and transversely to the path of movement of said arm whereby said arm may be locked to hold its laterally extending portion in its non-operative position.

2. In combination, a pair of spaced contacts, a movable bridging member therefor adapted to close an electric circuit when connected across said spaced contacts, a bolt shiftable between the contacts and transversely to the path of movement of said bridging member, whereby the bridging member may be locked in its non-operative position, and an electro-magnet whereby the bolt may be shifted to permit the bridging member to be moved to its operative position.

3. A locking mechanism for opening or closing an electric circuit, comprising a switch adapted for closing the circuit when moved to a predetermined position, a longitudinaly slidable bolt adapted to be brought into the path of the switch and lock the same in its open position, an electro-magnet, and means between the electro-magnet and bolt whereby upon the electro-magnet being energized the bolt may be moved or shifted from its locking position.

4. A locking mechanism for opening or closing an electric circuit, comprising a switch adapted for closing the circuit when moved to a predetermined position, a longitudinally slidable bolt adapted to be brought into the path of the switch and lock the same in its open position, a fulcrum lever having its one end bifurcated and engaging said bolt and its other end carrying an armature whereby upon the electro-magnet being energized the lever will be moved for shifting said bolt from its locking position.

5. A locking mechanism for opening or closing an electric circuit, comprising a switch adapted for closing the circuit when moved to a predetermined position, a longitudinally slidable bolt adapted to be brought into the path of the switch and lock the same in its open position, means for normally maintaining said bolt in its locking position, an electro-magnet, and means between the electro-magnet and bolt whereby upon the electro-magnet being energized the bolt may be moved or shifted from its locking position.

6. A locking mechanism for opening or closing an electric circuit, comprising a switch adapted for closing the circuit when moved to a predetermined position, a longitudinally slidable bolt adapted to be brought into path of the switch and lock the same in its open position, yieldable means for maintaining the bolt in its locking position, an electro-magnet, and means between the electro-magnet and bolt whereby upon the electro-magnet being energized the bolt may be moved or shifted from its locking position.

7. A locking mechanism for opening or closing an electric circuit, comprising a switch adapted for closing the circuit when moved to a predetermined position, a longitudinally slidable bolt adapted to be brought into the path of the switch and lock the same in its open position, a coil spring adapted to yieldingly resist longitudinal movement of the bolt and maintain the same in its locking position, an electro-magnet, and means between the electro-magnet and bolt whereby upon the electro-magnet being energized the bolt may be moved or shifted from its locking position.

8. A locking mechanism for opening or closing an electric circuit, comprising a pair of terminals dividing the electric circuit, a pivoted switch arm having its free end formed with an extension adapted to electrically connect the two contacts when brought to a predetermined position, a bolt longitudinally movable and adapted to be brought into position for locking the switch in its open position, and electro-magnetic means operable from a remote point whereby said bolt may be moved to its unlocking position with respect to the switch.

9. In a locking mechanism for opening or closing an electric switch, comprising in combination, a switch arm pivoted at its one end and having its free end formed with an extension, a pair of contacts adapted to close an electric circuit when connected and also adapted to be electrically connected by the extension of said switch arm when said switch arm is moved to a predetermined position, a bolt longitudinally movable and extending at right angles to the plane in which the switch arm operates, spring means adapted to normally press the bolt in position to be disposed in the path of said switch arm and lock the switch arm in its open position, an electromagnet, and connecting means with said bolt whereby said bolt may be moved to its inoperative position with respect to the switch.

10. A locking mechanism for opening and closing an electric switch, comprising a switch arm pivoted at its one end, a pair of electrical contacts, an extension upon the free end of said switch arm adapted to connect said pair of contacts when the switch arm is moved to a predetermined position, a bolt longitudinally movable and disposed between said contacts and adapted to be brought into the path of said switch, and means whereby the second electric circuit may be established upon said switch arm engaging said bolt.

11. A locking mechanism for opening and closing an electric circuit, comprising a switch arm pivoted at its one end, a pair of electrical contacts adapted to establish an electric circuit when connected together, an extension upon said switch arm adapted to bridge said contacts when said switch arm is swung to a predetermined position, a bolt longitudinally movable and disposed between said contacts, spring means for pressing the bolt in a direction so that the same may be disposed in the path of said switch arm, means for moving the bolt forwardly with relation to the switch arm so that the switch arm may be swung to a position for connecting said contacts, and means carried by the bolt whereby when the same is engaged by the switch arm a second electrical circuit may be established.

FRANK HOYT.
CHANDLER FINNIE HOLMES.